(12) United States Patent
Powers et al.

(10) Patent No.: US 7,140,826 B2
(45) Date of Patent: Nov. 28, 2006

(54) SHAPED ANCHOR

(75) Inventors: Jeffrey R. Powers, Larchmont, NY (US); Paul Gaudron, Stamford, CT (US)

(73) Assignee: Powers Fasteners, Inc., Brewster, NY (US)

( * ) Notice: Subject to any disclaimer, the term of this patent is extended or adjusted under 35 U.S.C. 154(b) by 0 days.

(21) Appl. No.: 10/283,340

(22) Filed: Oct. 30, 2002

(65) Prior Publication Data

US 2004/0086358 A1    May 6, 2004

(51) Int. Cl.
*F16B 15/00*        (2006.01)
(52) U.S. Cl. .................................... 411/451.2; 411/447
(58) Field of Classification Search ............. 411/451.2, 411/451.5, 446, 447
See application file for complete search history.

(56) References Cited

U.S. PATENT DOCUMENTS

| | | |
|---|---|---|
| 48,494 A | 6/1865 | Storm |
| 116,990 A | 7/1871 | Plumkett |
| 372,844 A | 11/1887 | Emerson et al. |
| 387,184 A | 7/1888 | Rogers |
| 428,498 A | 5/1890 | Laundry et al. |
| 446,042 A | 2/1891 | Warren |
| 1,170,603 A | 2/1916 | Brunner |
| 1,466,676 A | 9/1923 | Stronach et al. |
| 1,574,790 A | 3/1926 | Carroll |
| 1,637,419 A | 8/1927 | Klein |
| 1,774,846 A | 9/1930 | Rosenberg |
| 1,798,468 A | 3/1931 | Hartzler et al. |
| 1,821,400 A | 9/1931 | Peirce |
| 1,971,726 A | 8/1934 | Norwood |
| 1,973,201 A | 9/1934 | Fassinger |
| 2,006,813 A | 7/1935 | Norwood |
| 2,196,534 A | 4/1940 | Neal |
| 2,256,401 A | 9/1941 | Maze |
| 2,690,693 A | 10/1954 | Campbell |
| 2,942,819 A | 6/1960 | Brogan |
| 3,022,701 A | 2/1962 | Potruch |
| 3,122,049 A | 2/1964 | Dieterich et al. |
| 3,219,248 A | 11/1965 | Krewson |
| 3,391,720 A | 7/1968 | Morse |
| 3,423,778 A | 1/1969 | Morse |
| 3,427,919 A | 2/1969 | Lerich |
| 3,478,640 A | 11/1969 | Elders |
| 3,494,244 A | 2/1970 | Wayland |

(Continued)

FOREIGN PATENT DOCUMENTS

AT    71212    2/1916

(Continued)

OTHER PUBLICATIONS

Dec. 26, 2001 Wolfram Research http://mathworld.wolfram.com.*

(Continued)

*Primary Examiner*—William L. Miller
(74) *Attorney, Agent, or Firm*—Morgan, Lewis & Bockius LLP

(57) ABSTRACT

An anchor for masonry. The anchor is relatively smooth walled and is forcibly driven into a hole formed in masonry or other suitable material for purposes of attaching fixtures. When driven into the hole, a shaped portion of the anchor is deformed in such a manner as to facilitate a 360 degree or greater bearing surface with the holes of wall. The walls of the hole impose forces onto the shank along this bearing surface which tend to deform shank into alignment with the hole by primarily elastic deformation so that the resulting frictional forces between the shank and the wall resist dislodgment from the hole.

19 Claims, 7 Drawing Sheets

U.S. PATENT DOCUMENTS

| | | |
|---|---|---|
| 3,495,494 A | 2/1970 | Scott |
| 3,511,128 A | 5/1970 | Garrison |
| 3,518,915 A | 7/1970 | Gutshall |
| 3,578,200 A | 5/1971 | Hetzer |
| 3,653,217 A | 4/1972 | Williams |
| 3,748,673 A | 7/1973 | Anderson |
| 3,791,750 A | 2/1974 | Cameron |
| 3,803,889 A | 4/1974 | Muenchinger |
| 3,894,469 A | 7/1975 | Nilsson |
| 3,895,773 A | 7/1975 | Solo |
| 3,942,329 A | 3/1976 | Babcock |
| 4,195,547 A | 4/1980 | Giannuzzi |
| 4,263,830 A | 4/1981 | Burström |
| 4,312,611 A | 1/1982 | Herb |
| 4,342,982 A | 8/1982 | Plasko |
| 4,350,464 A | 9/1982 | Brothers |
| 4,572,720 A | 2/1986 | Rockenfeller et al. |
| 4,637,539 A | 1/1987 | Turcott et al. |
| 4,696,423 A | 9/1987 | Ryan |
| 4,828,445 A | 5/1989 | Giannuzzi |
| 4,890,779 A | 1/1990 | Giannuzzi |
| 4,963,062 A | 10/1990 | Giannuzzi |
| 4,996,860 A | 3/1991 | Shinjo |
| 5,035,559 A | 7/1991 | Nilsen |
| 5,049,018 A | 9/1991 | Murphy |
| 5,069,588 A | 12/1991 | Hasan et al. |
| 5,122,022 A | 6/1992 | Kluser |
| 5,299,897 A | 4/1994 | Marquardt |
| 5,381,682 A | 1/1995 | Marquardt et al. |
| 5,489,178 A | 2/1996 | Harker |

FOREIGN PATENT DOCUMENTS

| | | |
|---|---|---|
| AT | 210 677 | 8/1960 |
| AT | 215741 | 6/1961 |
| AT | 279 128 | 2/1970 |
| DE | 915 732 | 7/1954 |
| DE | 3 620 372 | 1/1988 |
| DE | 100 35 619 | 1/2002 |
| EP | 0 172 617 | 4/1989 |
| FR | 1.005.851 | 10/1947 |
| FR | 2 468 024 | 4/1981 |
| GB | 152736 | 10/1920 |
| GB | 365927 | 1/1932 |
| GB | 428420 | 5/1935 |
| GB | 2 103 748 | 2/1983 |
| JP | 55-122 918 | 9/1980 |

OTHER PUBLICATIONS

RawlTech Bulletin, Rawl-Spike #3700R, (Jul. 15, 1985).*
English Translation by U.S. Patent and Trademark Office of French Patent No. 2,468,024.
English Translation by U.S. Patent and Trademark Office of Germany Patent Publication No. 915,732.
English Translation by U.S. Patent and Trademark Office of Japanese Kokai Patent Application Publication No. Sho 55[1980]-122918.
English Translation by Takaaki Nozawa of Japanese Kokai Patent Publication Sho 55-122918.
German Patent Abstract, DE 3620 372, Derwent Publications Ltd.
German Patent Abstract, DE 10035619, Detwent Publications Ltd.
*RawlTech Bulletin*, "Rawl-Spike #3700R," Jul. 15, 1085.
*The Rawlplug Company, Inc. v. Illinois Tool Works, Inc., Illinois Tool Works, Inc.*, 11 F.3d 1036 (Fed. Cir. 1993) (EXHIBIT 1).
Appellant's Opening Brief, *The Rawlplug Company, Inc. v. Illinois Tool Works, Inc., Illinois Tool Works, Inc.*, 11 F.3d 1036 (Fed. Cir. 1993) (92-1356) (EXHIBIT 2).
Appellee's Opening Brief, *The Rawlplug Company, Inc. v. Illinois Tool Works, Inc., Illinois Tool Works, Inc.*, 11 F.3d 1036 (Fed. Cir. 1993) (92-1356) (EXHIBIT 3).
Appellant's Reply Brief, *The Rawlplug Company, Inc. v. Illinois Tool Works, Inc., Illinois Tool Works, Inc.*, 11 F.3d 1036 (Fed. Cir. 1993) (92-1356) (EXHIBIT 4).

* cited by examiner

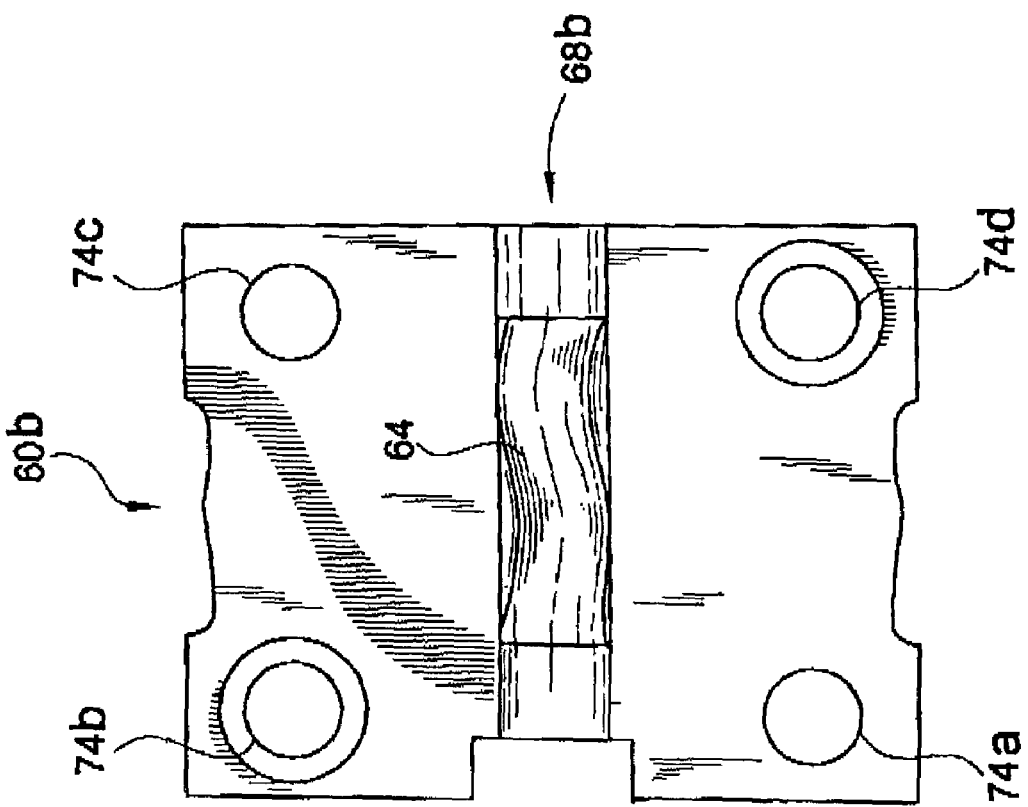
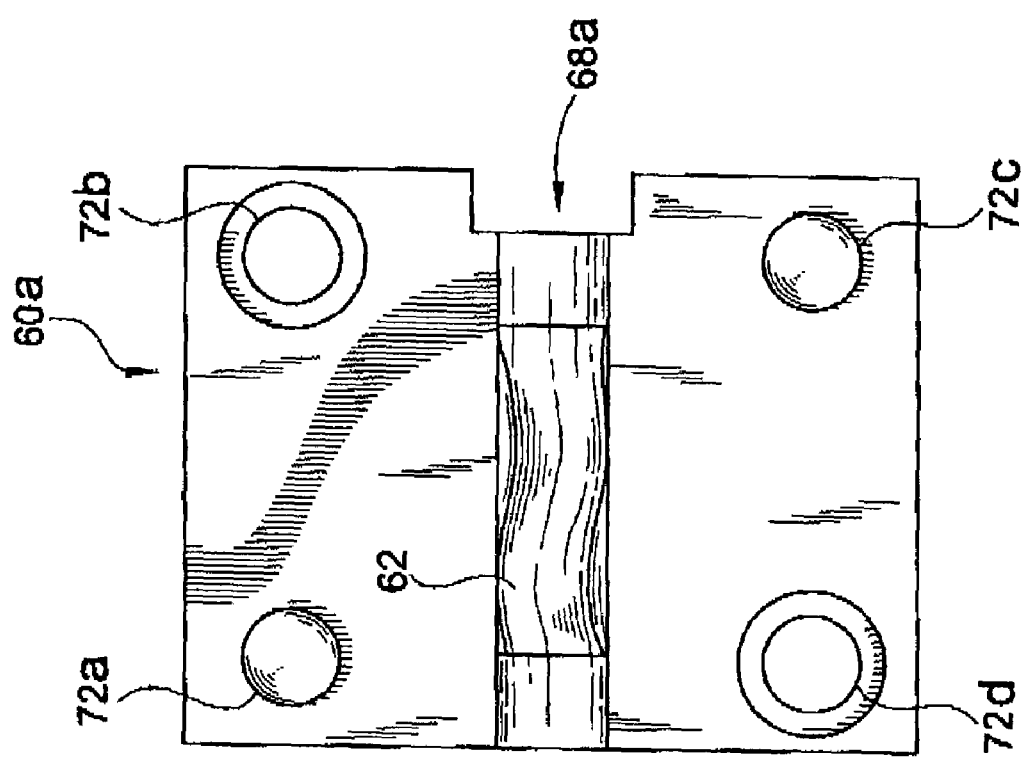

SHAPED ANCHOR

The invention relates broadly to an anchor for securing fixtures to masonry or other material, and more particularly, the invention relates to a shaped anchor having a multi-planar bend adapted for engaging a hole wall over an extended surface area so as to provide an increased resistance to dislodgment when the anchor is loaded.

BACKGROUND OF THE INVENTION

Anchors for masonry or other structure are known, as in U.S. Pat. Nos. 4,963,062 and 4,828,445 to Giannuzzi. In these anchors, one or more undulations may be formed in the shank. The undulations function as a means for providing a tight fit in the hole for purposes of securing the shank within the hole. The anchor's shank is forcibly driven into the hole. As the shank is forced into the hole, the shank undulation is elastically deformed as it comes into contact with the wall. A frictional fit of the shank in the hole results from the pressure forces exerted on the wall by the shank as it attempts to return to its original shape.

It would be desirable to have an anchor that provides increased surface area contact between the shank and hole wall resulting from an elastic deformation of the anchor as it is driven into the hole, in a relatively simple manner, without excessive manufacturing or other associated costs, and without requiring a high degree of skill in order to use the anchor in practice. Among the benefits of such an anchor are improved retention forces for the shank within the hole over the same length shank. It would also be desirable to have a 360 degree or greater frictional hold between the shank and the hole in the event that the hole wall becomes weakened, such as by fracture of the mating material in the vicinity of the hole.

SUMMARY OF THE INVENTION

The above needs are met, and the shortcomings of prior art anchors are overcome by the shaped anchor of the invention. According to one embodiment, an anchor for masonry is adapted for being driven into a hole formed in masonry, or another suitable material, in a direction approximately perpendicular to the masonry plane. The anchor includes a head, a shank extending from the head and having an end, the shank including an upper shank portion extending from the head, having a longitudinal axis and defining a nominal shank diameter, and a curved shank portion extending between the upper shank portion and the shank end, the curved shank portion being shaped so as to describe a bearing surface that is disposed at a greater distance from the longitudinal axis than the nominal shank diameter and extends through an angle of less than 360 degrees about the longitudinal axis.

The shank allows for greater surface contact with the walls of a hole than previously attainable over the same length distance because unlike other known anchors, a frictional engagement may be attained circumferentially and continuously about the shank axis. The shank surface is preferably smooth over its length to minimize any chipping or gauging as the shank is forcibly inserted into the hole (e.g., by striking the head of the anchor with a hammer). There is little skill required to insert shank into the hole. Thus, the anchor of the invention has wide uses and does not require specialized tools or manpower.

In another embodiment, an anchor for masonry includes a shank having a twisting portion disposed between an upper portion and terminal end. The shank has a longitudinal axis passing through the upper portion and terminal end, wherein when viewed in a first plane, the twisting portion describes one and only one first bend and when viewed in a second plane, perpendicular to the first plane, the twisting portion describes one and only one second and third bends. A bearing surface of the shank is provided which attains one of a 360 degree and greater than 360 degree friction-fit engagement between the hole wall and shank by elastic deformation of the shank as it is driven into the hole, the bearing surface comprising a curved surface formed by the first, second and third bends. In this embodiment, the first bend may approximate a half sine wave and the second and third bends together approximate a full sine wave of a different peak-to-peak extent than the first bend.

The deformation of shank, when driven into the hole, occurs substantially within the elastic range of the anchor material, thereby creating high elastic restoring forces in the anchor. These restoring forces produce frictional forces between the shank and hole which resist dislodgment from the hole.

In another embodiment, the shank of the anchor includes an upper end, a lower end, a longitudinal axis passing through the centroid of the cross-sections of the upper and lower ends and a nominal shank outer radius. The anchor further includes a shaped section disposed between the upper and lower ends and including a circumferentially extending portion extending along a length of the shank, the portion taking the shape of an approximately 360 degree bulge in a plane view orientated perpendicular to the longitudinal axis, the outer surface of the bulge gradually increasing in offset distance from the longitudinal axis wherein a maximum radial distance from the nominal shank outer surface occurs at 180 degrees and then returning to a near zero offset from the nominal shank outer surface at approximately 360 degrees, the shape of the bulge being approximated by the equation $r = R + H \sin^2(\Phi/2)$, wherein $r$ is the radial offset of the bulge outer surface from the longitudinal axis, $R$ is the nominal shank radius, $\Phi$ is the angle measured about the longitudinal axis and $(R+H)$ is the maximum radial offset of the bulge outer surface from the longitudinal axis.

In another embodiment of the invention, a method of securing a masonry anchor in masonry by frictional engagement with the masonry includes the steps providing an anchor including a shank having a longitudinal axis and a first and second shank portion, the first shank portion having a generally circular cross-section when projected onto a plane that is perpendicular to the longitudinal axis and the second shank portion including a generally elliptical cross-section when projected onto the plane, providing a hole in the masonry, the hole having cross-sectional dimensions that are non-conforming to the second shank portion cross-section, forcibly driving the shank into the hole so as to cause the shank to undergo a substantially elastic deformation in the vicinity of the second shank portion, the deformation tending to align the first and second shank portions with the cross-section of the hole and the shank exerting elastic restoring forces on the walls of the hole in response to the elastic deformation, wherein when the first and second shank portions are disposed in the hole, the second shank portion describes an approximately circular cross section.

Additional features and advantages of the invention will be set forth or be apparent from the description that follows. The features and advantages of the invention will be realized and attained by the structures and methods particularly pointed out in the written description and claims hereof as well as the appended drawings.

It is to be understood that both the foregoing general description and the following detailed description are exemplary and explanatory and are intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate preferred embodiments of the invention and together with the description serve to explain the principles of the invention. In the drawings:

FIGS. 7A and 7B are planar views of a tooling for forming the shank.

DETAILED DESCRIPTION OF THE PREFERRED EMBODIMENTS

Figure 1A:
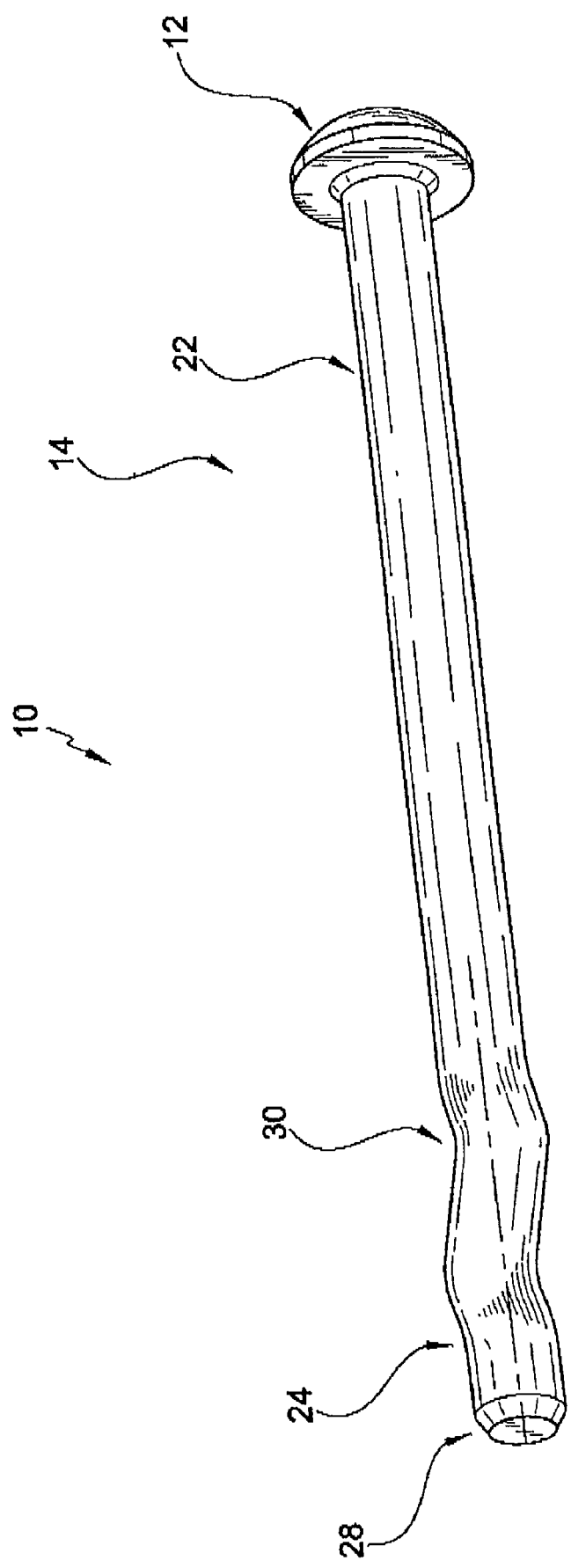
FIG. 1A is a perspective view of a first embodiment of an anchor made in accordance with the principles of the invention.
Figure 1B:
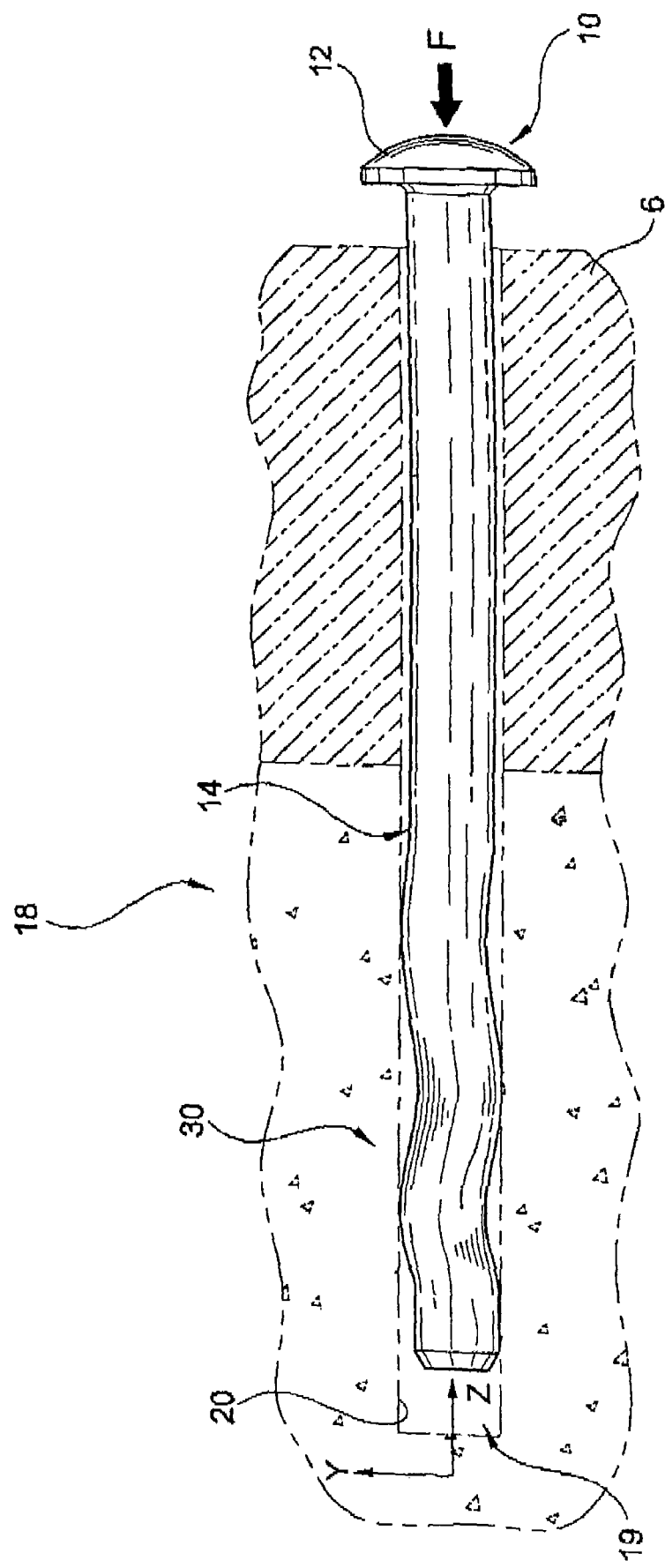
FIG. 1B is a plan view of the anchor of FIG. 1A inserted into a hole of masonry.

Referring to FIG. 1A, a preferred embodiment of an anchor 10 is shown in perspective view. Referring to FIG. 1B, anchor 10 is shown inserted into a pre-formed hole 19 of masonry 18 with anchor being used to attach a fixture 6 to masonry 18. Anchor 10 may be used to attach fixture 6 to the surface of masonry in much the same manner as the anchor described in U.S. Pat. No. 4,963,062, herein incorporated by reference in its entirety. Anchor 10 is forcibly inserted into hole 19 and securely held therein by frictional forces that resist removal of anchor 10 from hole 19.

Figure 2A:
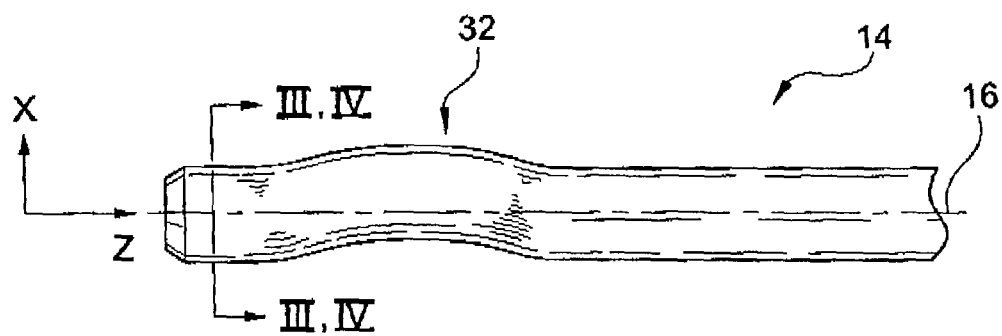
FIGS. 2A–2D are multiple plan views of the anchor of FIG. 1. The planar views are located according to an X-Y-Z Cartesian coordinate system with the Z-axis being parallel to and co-linear with the longitudinal axis of a shank of the anchor and the planar views lie in the Y-Z and X-Z planes, respectively.
Figure 2B:
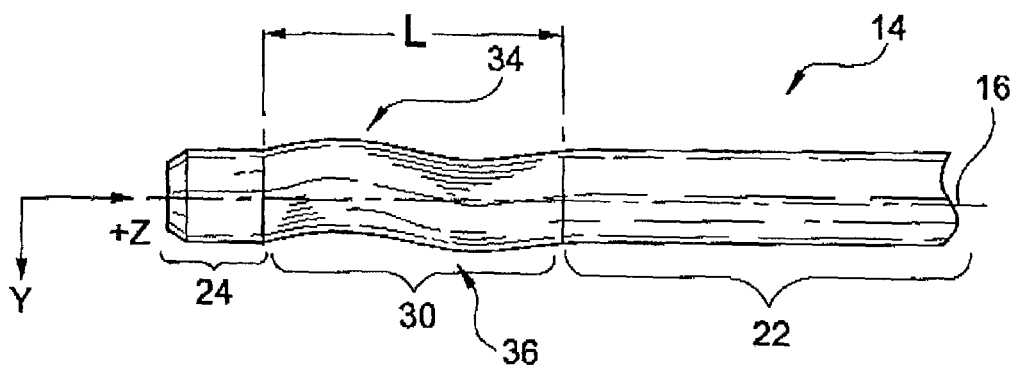
Figure 2C:
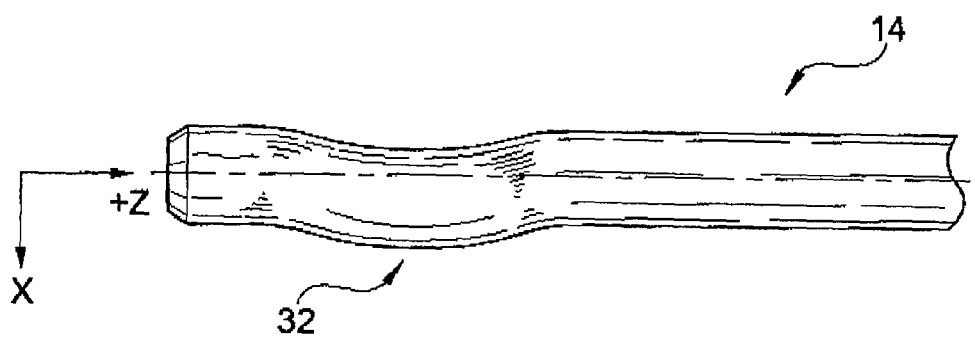
Figure 2D:
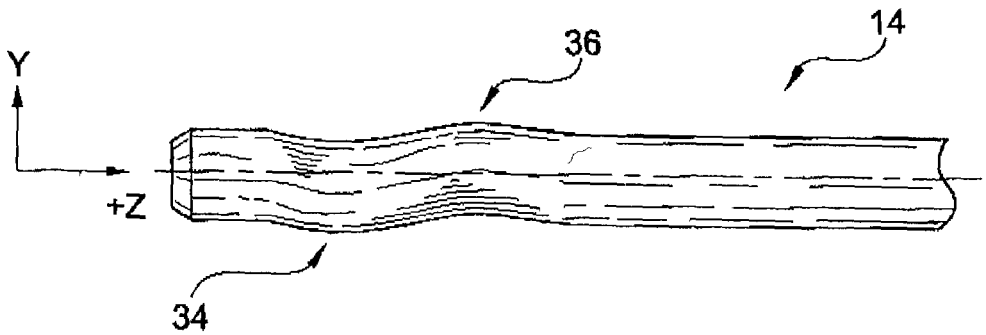

Anchor 10 includes a shank 14 preferably formed from a solid piece of carbon or stainless steel that is generally circular in cross section. Shank 14 may also be hollow and without an integral head 12 for purposes of e.g., providing a threading or other type of mount on the inner wall surface of the shank for securing a fastener and/or fastener mount to shank 14. A shaped portion 30 is formed along shank 14 to facilitate a frictional hold of anchor 10 within hole 19. A head 12 is integral with shank 14 at one end and a tapered end 28 is formed at the opposite end to assist with guiding anchor 10 into hole 19. Shaped portion 30 is preferably disposed between an upper portion 22 and lower portion 24 of shank 14, as indicated in FIG. 2B. The outer surface of shank 14 along upper and lower portions 24, 22 extend parallel to the longitudinal axis 16 of shank 14 whereas the outer surface of shank 14 at shaped portion 30 describes a three-dimensional bend which deviates from, and extends circumferentially about shank axis 16. After forming anchor 10, shank 14 is rendered resilient by tempering the metal at an appropriate temperature to impart memory to the metal so that a subsequent deformation of shank 14 when inserted into an appropriately sized hole will occur substantially within the elastic range of the material.

Anchor 10 may be axially driven into a pre-drilled hole of masonry or other material by applying an axial force F to head 12, such as by striking head 12 with a hammer. Hole 19, which may be cylindrical, is sized to be slightly greater than the generally circular cross-section of shank 14. As anchor 10 advances into hole 19, shank axis 16 aligns with the longitudinal axis of hole 19 and is axially aligned with hole 19 when fully lodged in hole 19. When shaped portion 30 encounters walls 20, the bends formed on shank 14 abut walls 20 of hole 19 because surfaces within this region of shank 14 (i.e., shaped portion 30) extend beyond the dimensions of hole 19 as anchor 10 is being driven axially into hole 19. The hole 19, whether it be formed in masonry or another suitable material, are preferably essentially non-compliant relative to the stiffness of shank 14. Therefore, as shaped portion 30 encounters walls 20, the bends of shaped portion 30 will be forced into near alignment with walls 20 by deformation of shank 14. The degree of deviation about shank axis 16 in shaped portion 30 is suitably chosen to limit deformation to within the elastic range of the material so that shank 14 will exert a high magnitude opposing force on walls as it seeks to retain its original shape. This opposing force exerted upon walls 20 creates a frictional engagement between anchor 10 and hole 19 which is primarily responsible for providing a resistance to dislodgment of anchor from hole 19 when external forces are applied to anchor 10. Indeed, when using a material having a high Young's modulus (e.g., 1020 steel), anchor 10 is capable of sustaining loads of several thousands of pounds over a relatively short insertion depth without becoming dislodged from masonry 18.

The surface of shank 14 is generally smooth so as to minimize any gauging or chipping of walls 19 as anchor 10 is driven into hole 19. Such chipping or gauging of holes 19 re-shapes hole 19, which can limit the ability of hole 19 to deform shank 14. If the amount of elastic deformation of shank 14 is reduced as a result of re-shaping of hole 19, the corresponding magnitude of restoring force is reduced, which then reduces the amount of frictional holding force of anchor 10 within hole 19.

The magnitude of frictional force that will resist dislodgment of anchor 10 from hole 19 is proportional to the amount of surface contact achieved between shank 14 and walls 19 as anchor is driven into hole 19. As such, it is desirable to have shank 14 deform in such a manner as to facilitate contact with holes 19 over a large surface area of shank 14. It is also desirable to achieve an increased surface contact about the entire circumference of shank 14, a result heretofore not achievable in the prior art. Such a circumferential, or 360 degree (or greater) surface contact can provide an increased holding force over the same longitudinal extent of shank 14 and a more reliable frictional hold for anchor 10 in hole 19 in the event of a weakening of the masonry, such as by a crack formed in the vicinity of hole 19.

The surface counters of shank 14, and in particular, shaped portion 30 of anchor 10 will now be described in greater detail, with reference to FIGS. 2A–2D, 3 and 4. As mentioned above, shaped portion 30 includes a three-dimensional bend which deviates from, and extends circumferentially about shank axis 16. To assist with the description of the geometry of shank 14, a X-Y-Z Cartesian coordinate system for anchor 10 is introduced with origin at the junction of lower portion 24 and shaped portion 30, and the Z-axis parallel to and along shank axis 16 and extending from tapered end 28 towards head 12 of anchor 10.

Figure 3:
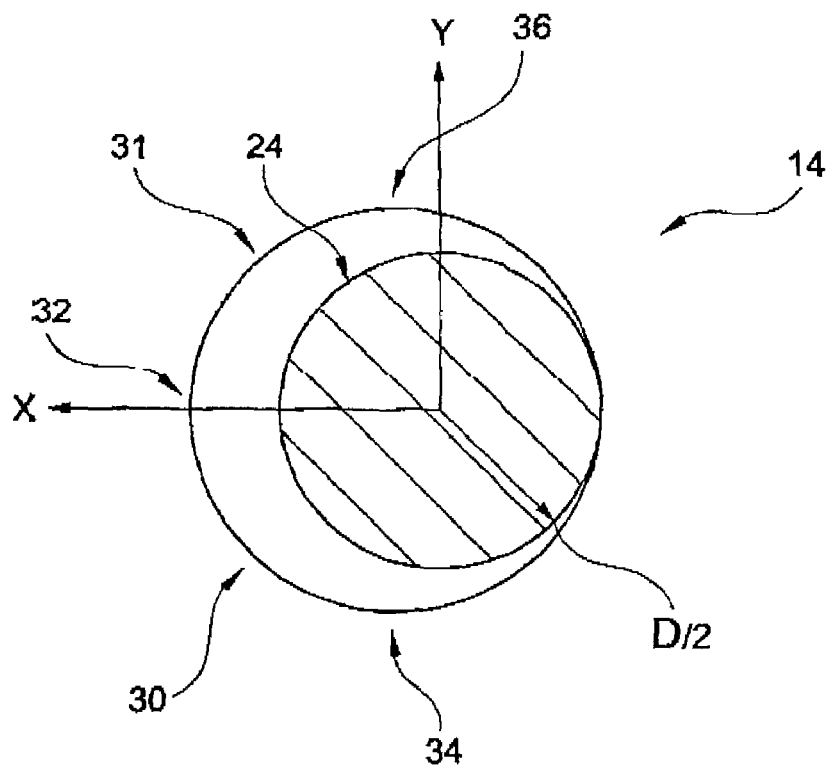
FIG. 3 is a view of the anchor of FIG. 1 taken along section III—III in FIG. 2A. A head of the anchor of FIG. 1 is not shown.

Referring to FIGS. 2A–2D, each of which show upper portion 22, shaped portion 30, and lower portion 24, the Z coordinate axis extends approximately along the geometric center of upper and lower portions 22, 24, which are generally cylindrical in shape with the outer surfaces being located a distance of D/2 from the Z-axis, where D is the outer diameter of upper and lower portions 22, 24. FIGS. 2A–2D are successive 90 degree planar views of shank 14. As illustrated, the three-dimensional, circumferentially extending bend of shaped portion 30 is such that a single bend 32 appears in the X-Z plane, FIGS. 2A and 2C, and bends 34 and 36 appear in the X-Z plane, FIGS. 2B and 2D. FIG. 3 shows a profile of shank 14 in the X-Y plane as taken at section III—III in FIG. 2A (head 12 not shown). As can be seen by comparing FIGS. 2A-2D with FIG. 3, bends 32, 34 and 36 together form a bulge 31 which extends about the Z coordinate axis with the maximum extent of bulge 31 being located along the +X axis at a distance H from the outer radius of lower portion 24.

Bulge 31 is the projection in the X-Y plane of a continuous bend that circumferentially-extends about the Z-axis. As can be seen by comparing FIGS. 2A and 2C with FIGS. 2B and 2D, the outer surface of bend 32 is located at a greater distance from the Z-axis than is bends 34 and 36. This difference in magnitude between bends 32 and 34, 36 in the X-Z and Y-X planes explains the shape of bulge 31 seen in FIG. 3, which is symmetric about the X-axis but asymmetric about the Y-axis. The portions of bulge 31 formed by bends 32, 34 and 36 is shown in FIG. 3. The three dimensional nature of the bend can be visualized as follows: as one follows the outer surface projection of bulge 31 in FIG. 3 in a clockwise direction (i.e., view the portion of bulge in the −Y/−X quadrant first, then −Y/+X quadrant, then +Y/+X quadrant, and then the +Y/−X quadrant), the Z-axis coordinate of this outer surface increases. The nature of bends 32, 34 and 36 may be thought of as sinusoidal such that bend 32 describes a half sinusoid and bends 34 and 36 together describe a full sinusoid.

Figure 4:
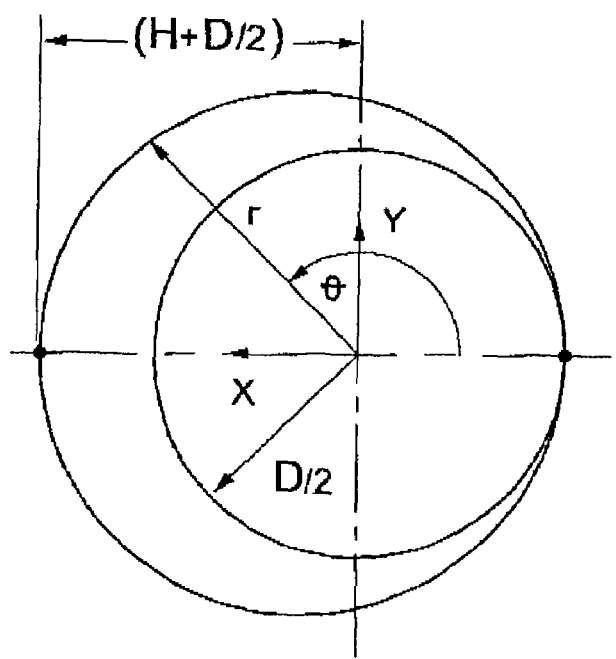
FIG. 4 is a geometric illustration of the shank taken along section IV—IV in FIG. 2A used to illustrate a mathematical representation of the surface contours of the shank.

The outer surface of the three-dimensional bend of shaped section 30 may also be appreciated by a mathematical equation of a curve approximately tracing the path of the circumferentially extending bend of shaped section 30. For simplicity, a polar equation is used with coordinate origin being coincident with the X-Y-Z coordinate system defined earlier. Referring to FIG. 4, let r be the radial distance of the outer surface of bulge 31 from the Z-axis; θ (radians) is the angular position of r about the Z-axis, D/2 is the nominal outer surface radial position for lower or upper portion, 22, 24, (D/2+H) is the maximum radial extent of bulge 31, which corresponds to the peak of bend 32 in FIG. 2A, L is the length of shaped portion 30, FIG. 2B, as measured along the Z-coordinate axis, and z is the z-coordinate. The coordinates r, θ, z for a point along the bend may be approximated by:

$$\theta = \theta$$

$$r = R + H(\sin^2(\theta/2))$$

$$z = (L/(2\Pi))\theta$$

Figure 5A:
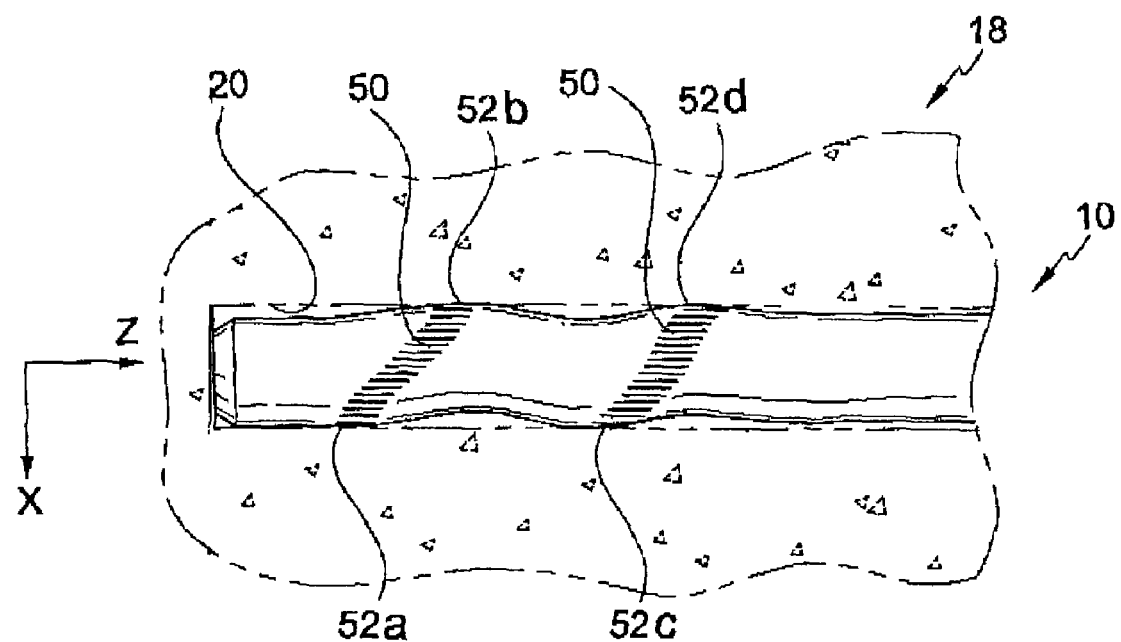
FIGS. 5A–5B is a view of the anchor inserted into a hole, as viewed in the X-Z and X-Y planes, respectively, showing a bearing surface of the anchor.
Figure 5B:
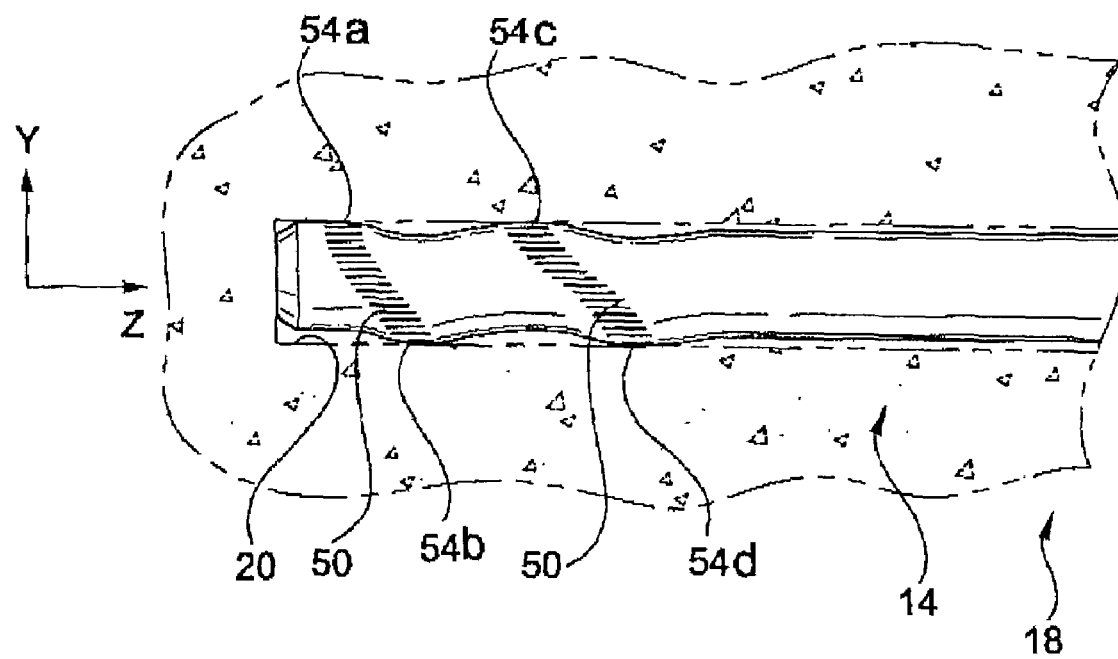

From this equation, it can be further appreciated the asymmetric cross section of shank 14 with respect to shank axis 16. As shank 14 is inserted into a hole in masonry, or another suitably chosen material, bulge will deform in such a manner as to form a more circular-type bulge. In general, however, it is advantageous that the bulge be such that when deformed by the hole, will tend to conform to the cross-sectional dimensions of the hole as in, e.g., circular for a circular hole, as this can promote a maximum amount of surface contact with the wall surface and/or a circumferentially and continuously extending surface contact. The deformed shape of bulge 31/bend of shaped portion 30 facilitates a greater-than 360 degree surface contact with walls 20 of hole 19 as anchor 10 is driven into hole 19. Referring to FIGS. 5A and 5B, a bearing surface 50 with walls 20 of hole 19 results from the elastic deformation of shank 14. The nature of this surface contact may be understood by noting the approximate areas of surface contact 54a, 54b, 54c and 54d in FIG. 5B (Y-Z plane) and 52a, 52b, 52c and 52d in FIG. 5A (X-Z plane). Thus, in three dimensions, bearing surface 50 extends continuously about shank 14. The shape of shaped portion 30 facilitates the creation of this greater than 360 degree bearing surface 50 with walls 20 because the bends 32, 34, 36, when encountering walls 19 as shank 14 advances into hole 19, extend circumferentially and continuously about the Z-axis through an angle of nearly 360 degrees. As a result, surfaces disposed about the entire circumference of shank 14 in the vicinity of shaped section 30 will be forced into contact with walls 19 in reaction to wall forces applied to the bends 32, 34, 36 along the length of shaped portion 30. This continuously extending, circumferential bearing surface 50 provides a increased surface contact between shank 14 and walls 20, which increases the frictional forces between shank 14 and hole 19 over the same length of similar anchors, such as the anchor described in U.S. Pat. No. 4,963,062. (the "'062 patent"). So, for example, if the shank length spanning B1, B2 and P in FIG. 1 of the '062 patent were equal to length L of anchor 10, FIG. 2B, the surface contact between shank and wall in this prior art anchor would be much less than the surface contact achieved by anchor 10 over this same length L. Thus, according to the invention, an anchor is provided which has a higher holding power then was previously attainable without the need to, e.g., provide additional planar bends in the shank over the length of the shank. It should be noted that the best results are achieved when anchor 10 has smooth surfaces so that anchor 10 does not chip or gauge hole 19. This will ensure the tightest fit in accordance with the shape of shank 14. The greater than 360 degree, continuous surface contact with walls 19 is a result of the three-dimensional, asymmetric aspects of shank 14 that allow shank 14 to be driven into hole 19 and deformed so as to engage walls 19 on all sides of shank 14.

Shank 14 may have a constant, nominal cross-section, as in anchor 10, or shank 14 may have a tapered cross-section (which may require a corresponding tapered hole 19). Shank 14 may be hollow so as to serve as an anchor point for attaching secondary fasteners, and shank may also include a damper (e.g., a rubber sleeve) disposed near head 12 to dissipate vibration energy transmitted through the masonry, which vibration energy may cause anchor 10 to become loosened in hole 19 over time.

Figure 6:
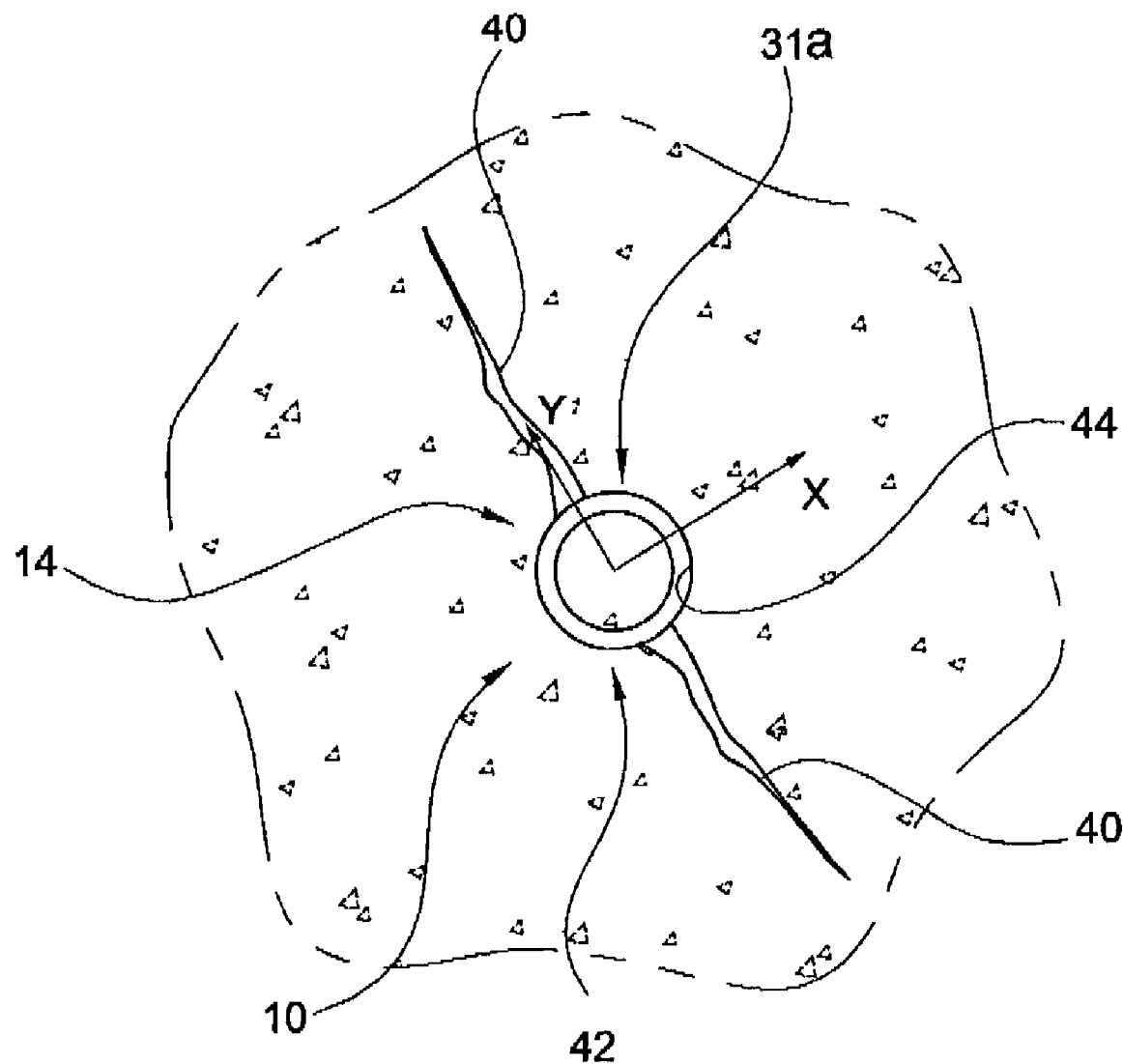
FIG. 6 is a view of the anchor of FIG. 1 embedded into a hole of masonry having a crack in the vicinity of the masonry hole.

FIG. 6 shows a view of anchor 10 embedded in a hole formed in masonry as viewed in the X-Y plane in the direction of the +Z axis. As mentioned above, anchor bulge 31a of anchor after insertion into the masonry hole is deformed in such a manner as to form a more circular bulge 31a extending about the entire circumference of shank 14. A fracture or crack has formed in the masonry in the Y-Z plane and the crack 40 extends through hole 42. As will be readily understood by the skilled artisan, such a crack will reduce the amount of available surface contact with hole 42 in the vicinity of its ruptured wall 44. If crack 40 were formed using an anchor with bends that provide less than a 360 contact, such a crack formation in the masonry may result in a significant loss of surface contact resulting in dislodgment of the anchor from hole 42. In particular, if an anchor having one or more planar bends is inserted into hole 42 and the plane of such bend(s) correspond substantially to the crack plane (i.e., the Y-Z axis in FIG. 6), the frictional forces retaining the anchor in hole 42 would be reduced since the shank would be allowed to return to its original shape, thereby reducing the elastic forces used to hold the anchor in the hole. The circumferentially and continuously extending surface contact of anchor 10 addresses this concern for cracked holes by establishing surface contact on all sides of shank 14. Thus, in FIG. 6, although the crack in the Y-Z plane would diminish the overall frictional forces holding shank 14 within hole 42, the portions of wall 44 not near crack 40 may still be usable to exert an effective, opposing force on shank 14 in response to the elastic restoring forces of shank 14. Thus, anchor 10 according to the invention is capable of maintaining a frictional hold between it and wall 44 in the event of a crack formation in any plane.

Referring to FIGS. 7A and 7B, one embodiment of an apparatus for forming shaped portion 30 includes a left and right plate 60a, 60b having formed thereon respective shaped channels 68a, 68b whose surfaces describe forming surfaces 62 and 64 for forming shaped portion 30 of anchor 10 when plates 60a, 60b are mated together. Forming methods known in the art may alternatively be used to form shaped portion 30. Thus, the invention is by no means limited to this or any other particular forming and/or pressing method for manufacture of an anchor.

The forming process using plates 60a, 60b preferably includes placing a heated cylindrical blank (heated to make the metal malleable) into a first channel (e.g., channel 68a) and then pressing the two plates together so that the two channels oppose each other to form a cylindrical impression (i.e., shaped portion 30) onto the blank. Holes 72a–d and posts 74a–d are provided on plates 60a, 60b to assist in guiding plate 60a into appropriate alignment with plate 60b during the pressing operation. After forming shaped portion 30, the anchor is rendered resilient by tempering at an appropriate temperature (as mentioned above).

In a second embodiment, shaped portion 30 may be formed by placing the cylindrical blank between and in mating contact with two plates having opposed, complimentary surface contours which together cooperate to form shaped portion 30 (the blank may be heated prior to the forming process, as in the first embodiment, to facilitate deformation of the material). One plate is moved relative to the other, which causes the blank to roll between the plates. As blank begins to roll, it encounters a gradually increasing, first slope formed on the first plate and a second, complimentary slope formed on the second plate. These two opposed slopes together cooperate to form the bend of shaped portion 30 as the blank is rolled between the two plates.

What is claimed is:

1. A resilient anchor insertable into a preformed masonry hole having walls, the combination anchor and hole comprising:
    an anchor shank having a smooth surface and including a circular upper end with adjoining straight upper shank section defining a nominal shank diameter, an opposite circular lower end with adjoining straight lower shank section, and a single asymmetric three-dimensional bulge disposed between the upper and lower straight sections of the shank and having a preinsertion length, the upper and lower ends defining a longitudinal axis passing through the ends, the upper and lower straight sections concentrically aligned with the longitudinal axis prior to inserting the anchor into the hole;
    wherein after the anchor is inserted into the hole, the bulge and at least part of the upper or lower straight shank section adjacent the bulge move into engagement with the walls of the hole creating uninterrupted contact between the surface of the anchor and the hole walls along a continuum of longitudinal positions that is greater in length than the preinsertion length of the bulge alone.

2. The anchor of claim 1, wherein at least part of both the upper and lower straight shank sections contact the walls of the hole.

3. The anchor of claim 1, wherein the shank does not substantially abrade the walls of the hole when driven therein.

4. The anchor of claim 1, wherein the bulge defines a first bend in a first plane and second and third bends each in a second plane that is oriented about 90 degrees to the first plane.

5. The anchor of claim 4, wherein the first bend is radially offset from the longitudinal axis by a distance greater than the second or third bends.

6. The anchor of claim 5, wherein the anchor is made of stainless steel or carbon steel.

7. The anchor of claim 1, wherein the anchor includes a head attached to the upper end for driving the anchor into the hole.

8. The anchor of claim 7, wherein the head has a diameter larger than the upper end.

9. The anchor of claim 1, wherein the shank is hollow.

10. A resilient anchor insertable into a preformed masonry hole having walls, the combination anchor and hole comprising:
    an anchor shank having a smooth surface and including a circular upper end with adjoining straight upper shank section defining a nominal shank diameter, an opposite circular lower end with adjoining straight lower shank section, and a single asymmetric three-dimensional bulge disposed between the upper and lower straight sections of the shank, the upper and lower ends defining a longitudinal axis passing through the ends, the upper and lower straight sections concentrically aligned with the longitudinal axis prior to inserting the anchor into the hole;
    wherein after the anchor is inserted into the hole, the bulge and at least part of the upper or lower straight shank section adjacent the bulge move into engagement with the walls of the hole creating uninterrupted contact between the surface of the anchor and the hole walls along a continuum of longitudinal positions.

11. The anchor of claim 10, wherein at least part of both the upper and lower straight shank sections contact the walls of the hole.

12. The anchor of claim 10, wherein the shank does not substantially abrade the walls of the hole when driven therein.

13. The anchor of claim 10, wherein the bulge defines a first bend in a first plane and second and third bends each in a second plane that is oriented about 90 degrees to the first plane.

14. The anchor of claim 13, wherein the first bend is radially offset from the longitudinal axis by a distance greater than the second or third bends.

15. The anchor of claim 10, wherein the anchor includes an enlarged head attached to the upper end for driving the anchor into the hole.

16. A resilient anchor insertable into a preformed masonry hole having walls, the combination anchor and hole comprising:
 an anchor shank having a smooth surface and including a circular upper end with adjoining straight upper shank section defining a nominal shank diameter, an opposite circular lower end with adjoining straight lower shank section, and a single asymmetric three-dimensional bulge disposed between the upper and lower straight sections of the shank, the upper and lower ends defining a longitudinal axis passing through the ends, the upper and lower straight sections concentrically aligned with the longitudinal axis prior to inserting the anchor into the hole;
 wherein after the anchor is inserted into the hole, the bulge and at least part of the upper or lower straight shank section adjacent the bulge move into engagement with the walls of the hole and creates greater than 360 degree uninterrupted circumferential contact between the surface of the anchor and the walls of the hole.

17. The anchor of claim 16, wherein at least part of both the upper and lower straight shank sections contact the holes of the wall.

18. The anchor of claim 16, wherein the shank does not substantially abrade the walls of the hole when driven therein.

19. The anchor of claim 16, wherein the bulge defines a first bend in a first plane and second and third bends each in a second plane that is oriented about 90 degrees to the first plane.

* * * * *